United States Patent [19]

Arolski et al.

[11] 4,031,264

[45] June 21, 1977

[54] METHOD FOR PRODUCING DURABLE FRUIT-DAIRY AND VEGETABLE-DAIRY DRINKS

[75] Inventors: Angel Tomov Arolski; Velichka Borissova Usheva; Peter Vassilev Gruev; Georgi Trendafilov Richev; Zvetana Semkova Doncheva, all of Plovdiv, Bulgaria

[73] Assignee: DSO "Bulgarplod", Sofia, Bulgaria

[22] Filed: May 15, 1975

[21] Appl. No.: 577,574

[52] U.S. Cl. .................................. 426/590; 426/584
[51] Int. Cl.² .......................................... A23L 2/02
[58] Field of Search .......... 426/580, 584, 583, 590, 426/599, 521, 577, 658

[56] References Cited

UNITED STATES PATENTS

| | | | |
|---|---|---|---|
| 2,761,780 | 9/1956 | Stewart | 426/580 |
| 2,834,679 | 5/1958 | Stoloff | 426/584 |
| 2,853,386 | 9/1958 | Hughes | 426/580 |
| 3,174,865 | 3/1965 | Johnston et al. | 426/584 |
| 3,978,243 | 8/1976 | Pedersen | 426/583 |

*Primary Examiner*—Raymond N. Jones
*Assistant Examiner*—C. A. Fan
*Attorney, Agent, or Firm*—Ladas, Parry, Von Gehr, Goldsmith & Deschamps

[57] ABSTRACT

In accordance with this invention there is provided a method for producing durable fruit-dairy and vegetable-dairy drinks, wherein 20 to 40% natural fruit or vegetable mash is mixed with 36–46% sour milk derived from skimmed or whole milk, with apple pectine, sugar syrup, citric acid (0.1–0.2%), followed by short-time high temperature sterilization, cooling, bottling and additional sterilization of the bottled drink, and wherein the various ingredients are mixed in sequence: to the sour milk the sugar syrup is added, then the pectine solution and finally the mash.

5 Claims, No Drawings

METHOD FOR PRODUCING DURABLE FRUIT-DAIRY AND VEGETABLE-DAIRY DRINKS

The invention relates to a method for producing durable fruit-dairy and vegetable-dairy drinks.

To date only fruit-dairy desserts and drinks requiring immediate consumption or ones which may be stored for a short duration have been produced, using fruit syrups, jams and fresh or sour milk. Those products may be kept for 60 days by refrigerated preservation at 4° to 8° C.

Durable fruit-dairy drinks are known to be produced on the basis of fresh milk and whey. They are sterilized for 25 min. at 100° C in periodically operating sterilizers. The drinks can be stabilized also by adding apple pectin.

U.S. Pat. No. 3,174,865 relates to production of durable fruit-dairy drinks on the basis of dry cows milk. According to this patent the drink is stabilized by adding gelatin.

The production of sour milk of short duration (1 month in the refrigerator) has been described. It requires heat treatment of a stream of coagulated milk at 74°–76° C for 60 sec. and adding the fruit ingredient afterwards.

It is the purpose of this invention to create a method for producing tasty dietetic and nourishing fruit-dairy and vegetable-dairy drinks which are stable for long duration even when stored at normal temperature.

The method according to the invention provides for using natural fruit or vegetable purees or mash-concentrates obtained by using technology accepted in the canning industry. All kinds of fruit-mash can be used: apple, peach, plum, apricot, quince, pear, strawberry, cherry, raspberry, grapes, gooseberry, pumpkin, tomato, carrot etc.

They are mixed with skimmed or whole-milk sour milk produced by the reservoir method and with acidity of 100°–140° T.

To prevent curdling of the sour milk apple pectin is added as stabilizer at the sterilization and storage.

When grapes, raspberries and gooseberry are used along with pectin other fruit-mashes are added, such as -apricot, peach and plum. To improve the taste refined sugar is added in an amount from 6–9%, depending on the varieties.

Exemplary ratios of the ingredients:
1.
  Fruit-mash — 35%
  Sour milk — 36%
  Sugar (as syrup) — 24%
  Pectin (as 2% water solution) — 5%
  Citric acid — 0.1–0.2%
2.
  Vegetable mash — 20%
  Sour milk — 46%
  Sugar (as syrup) — 29%
  Pectin (as 2% water solution) — 5%
  Citric acid — 0.1–0.2%

The ingredients are mixed in the following sequence: to the sour milk, well stirred, the sugar syrup is added, followed by the pectin solution and finally-the mash itself.

Under industrial conditions the drinks are prepared in dosages of 300 kg each in correctional boilers on the basis of the percentage ratios ennumerated below.

| Dosage of 300 kg Type of drink | Fruit or vegetable mash kg | Sour milk kg | Sugar syrup kg | Pectine solution kg |
|---|---|---|---|---|
| Apricots and sour milk | 105 | 108 | 72 | 15 |
| Carrots and sour milk | 60 | 138 | 87 | 15 |

The drink thus obtained is being deaerated and homogenized in a piston homogenizator under pressure of 150–200 atm. whereafter it is sterilized in a flow with a plate heat exchanger at 120°–125° C for 50–60 sec. whereafter it is cooled to 95°–100° C.

The sterilized product thus obtained is embottled and the bottles are sealed with crown cork covers type, the temperature of the content not lower than 93° C.

The drink thus bottled is additionally sterilized at 85°–90° C, for 8–10 min. in a constantly operating ribbon sterilizer-refrigeration from which the product comes out at a temperature of 35° C.

The fruit-dairy and vegetable-dairy drinks are stored at normal warehouse conditions.

The fruit-dairy and the vegetable-dairy drinks are durable products with excellent taste, flavor and high biological and nourishing quality. They are enriched with natural and easily assimilated lactic proteins (1.70–2.2%) and are of considerable caloric value of (50–55 cal/100g).

The drink according to the invention have the following qualitative indices, dry substance by refractometer—12%, the drinks made of tomatos and sour milk has dry substance by refractometer 10%; acidity (like apple one) in from 0.4 to 0.8%; pH from 3.15 to 4.1; sugar from 9.0 to 11.00%.

What we claim is:

1. Method for producing durable fruit-dairy or vegetable-dairy drinks containing 20 to 40% natural fruit or vegetable mash and 36 to 46% sour milk derived from skimmed or whole milk, apple pectin, sugar syrup and 0.1–0.2% citric acid which comprises adding the sugar syrup to the sour milk, adding apple pectin to the resulting mixture followed by adding the fruit or vegetable mash, subjecting the resulting mixture to short time high temperature sterilization, cooling, bottling and additionally sterilizing the bottled drink.

2. Method as claimed in claim 1 wherein 5% apple pectin as 2% water solution is added to the mixture.

3. Method as claimed in claim 1 wherein the sugar syrup constitutes 24% in the fruit-dairy drinks and 29% in the vegetable-dairy drinks.

4. Method as claimed in claim 1 wherein the heat treatment is carried out at 120° to 125° C for 50–60 seconds.

5. Method as claimed in claim 1 wherein after bottling the additional sterilization of the bottled drinks is conducted at a temperature of 85°–90° C for 8–10 minutes.

* * * * *